US006627292B1

(12) United States Patent
Hoffmann, Sr.

(10) Patent No.: US 6,627,292 B1
(45) Date of Patent: *Sep. 30, 2003

(54) SURFACE REPAIR ASSEMBLY INCLUDING NON-METALLIC REPAIR PATCH

(75) Inventor: Dennis Hoffmann, Sr., McHenry, IL (US)

(73) Assignee: Pro Patch Systems, Inc., McHenry, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,385

(22) Filed: Apr. 23, 1999

Related U.S. Application Data

(63) Continuation-in-part of application No. 09/022,395, filed on Feb. 12, 1998, now Pat. No. 6,231,949.

(51) Int. Cl.[7] .................................................. B32B 3/24
(52) U.S. Cl. .......................... 428/139; 428/137; 428/138; 428/63; 428/131; 428/134; 428/343; 428/41.7; 428/41.8; 428/43; 52/514; 52/514.5; 156/94
(58) Field of Search .......................... 428/63, 131, 138, 428/139, 134, 343, 41.7, 41.8, 43, 137; 52/514, 514.5; 156/94

(56) References Cited

U.S. PATENT DOCUMENTS

| 4,122,222 | A | | 10/1978 | Parker | 428/66 |
| 4,135,017 | A | | 1/1979 | Hoffmann, Sr. | 428/78 |
| 4,358,495 | A | | 11/1982 | Parker | 428/66 |
| 4,500,580 | A | * | 2/1985 | Luciani | 428/43 |
| 4,707,391 | A | | 11/1987 | Hoffmann, Sr. | 428/63 |
| 5,195,893 | A | * | 3/1993 | Casale | 434/87 |
| 5,287,673 | A | * | 2/1994 | Kreikemeier | 52/663 |
| 5,298,099 | A | | 3/1994 | Hoffmann, Sr. | 156/94 |
| 5,620,768 | A | | 4/1997 | Hoffmann, Sr. | 428/77 |
| 5,817,200 | A | * | 10/1998 | O'ffill | 156/94 |
| 6,231,949 | B1 | | 5/2001 | Offmann, Sr. | 428/19 |

* cited by examiner

Primary Examiner—William P. Watkins, III
(74) Attorney, Agent, or Firm—David I. Roche; Baker & McKenzie

(57) ABSTRACT

A surface repair patch for closing an opening around a fixture which is adjacent to or protrudes from a surface is provided. The surface repair patch comprises a sheet having a plurality of openings which extend from the first side to the second side of the sheet. The sheet supports, positions, and reinforces a curable repair compound on a surface before the repair compound is cured. The sheet includes a removable first section which has a border defined by a first line of holes. The first line of holes is configured such that the removable first section may be removed from the sheet by applying pressure to the removable first section. The sheet of the repair patch may further include a removable second section having a border defined by a second line of holes which facilitate removal of the removable second section from the sheet. The sheet may also include a third line of holes which extend from the border of the removable first section to the periphery of the sheet. The third line of holes facilitates separation of a first portion of the sheet, which is on a first side of the third line of holes, from a second portion of the sheet, which is on a second side of the third line of holes. A method of using the surface repair patch together with a curable repair compound to close an opening around a fixture which is adjacent to or protrudes from a surface is also provided.

12 Claims, 3 Drawing Sheets

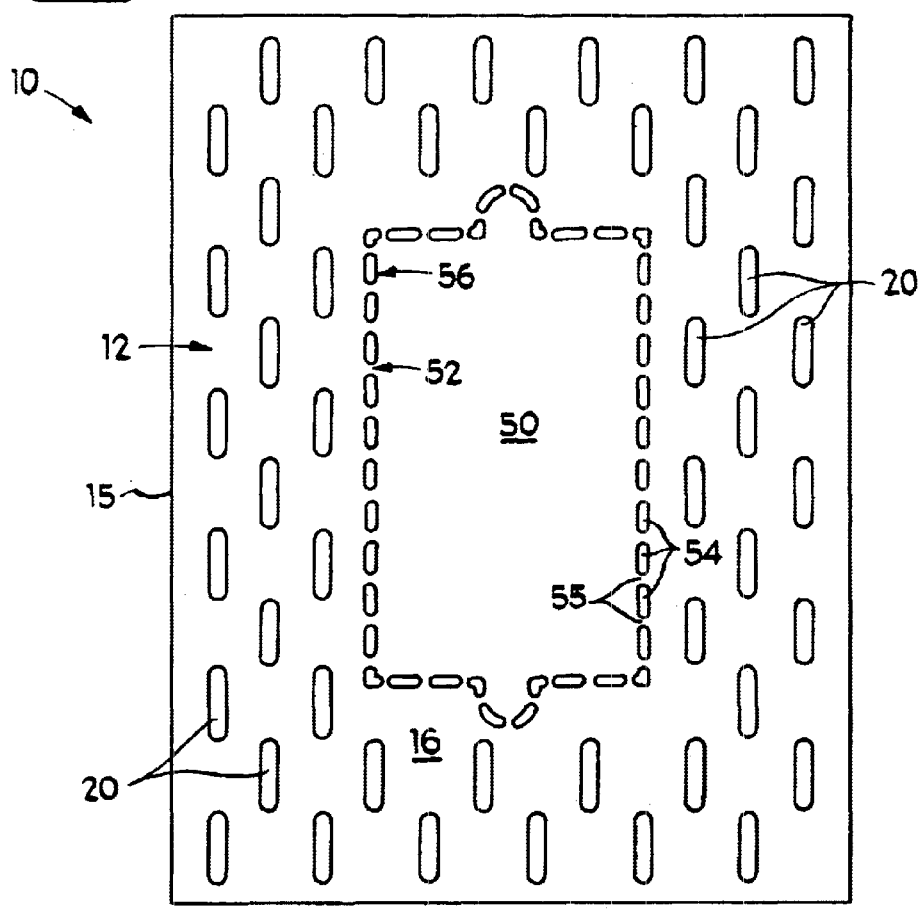
Fig 1
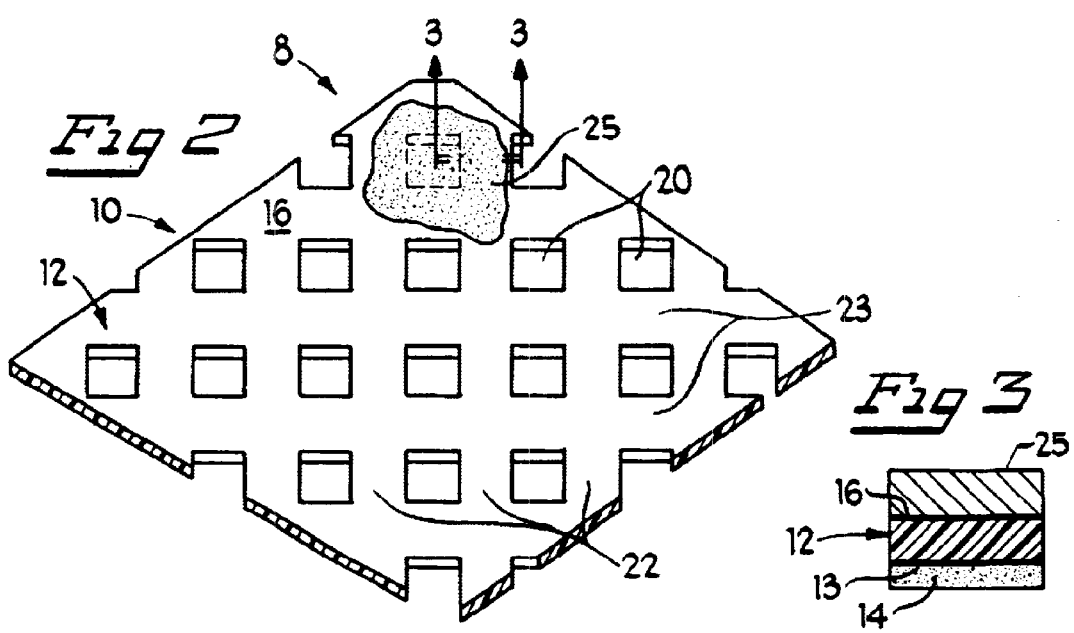
Fig 2
Fig 3

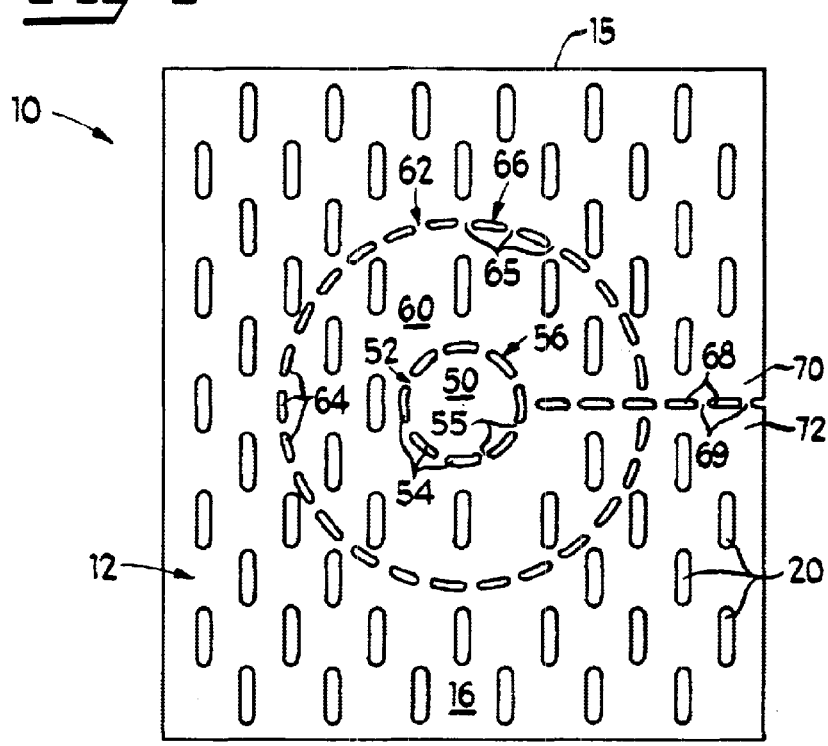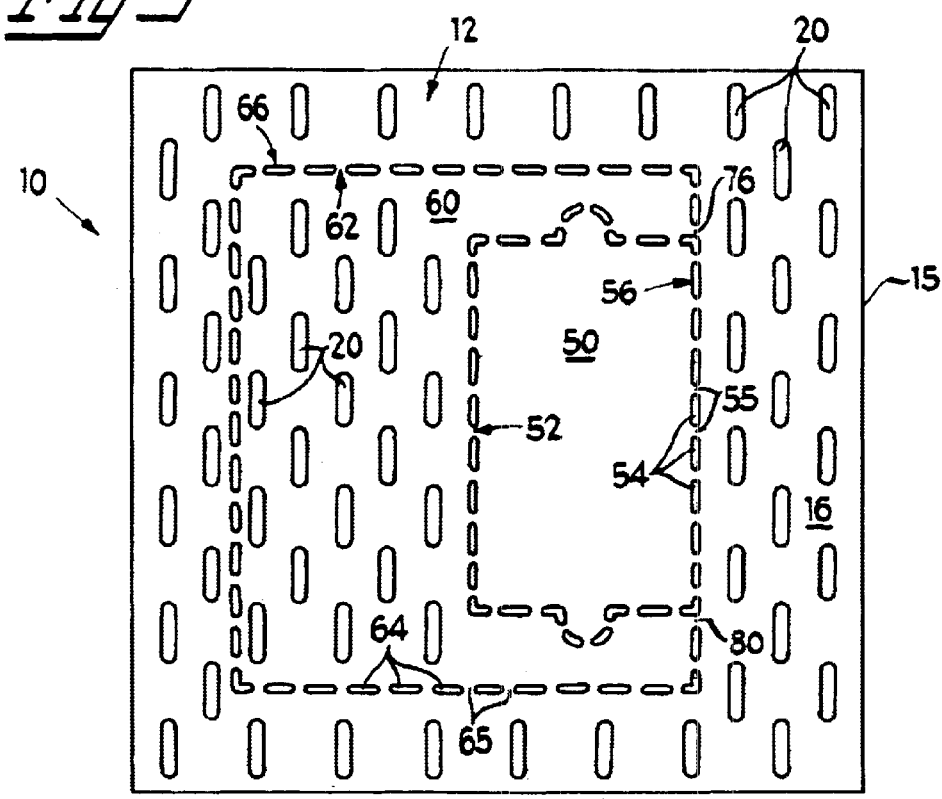

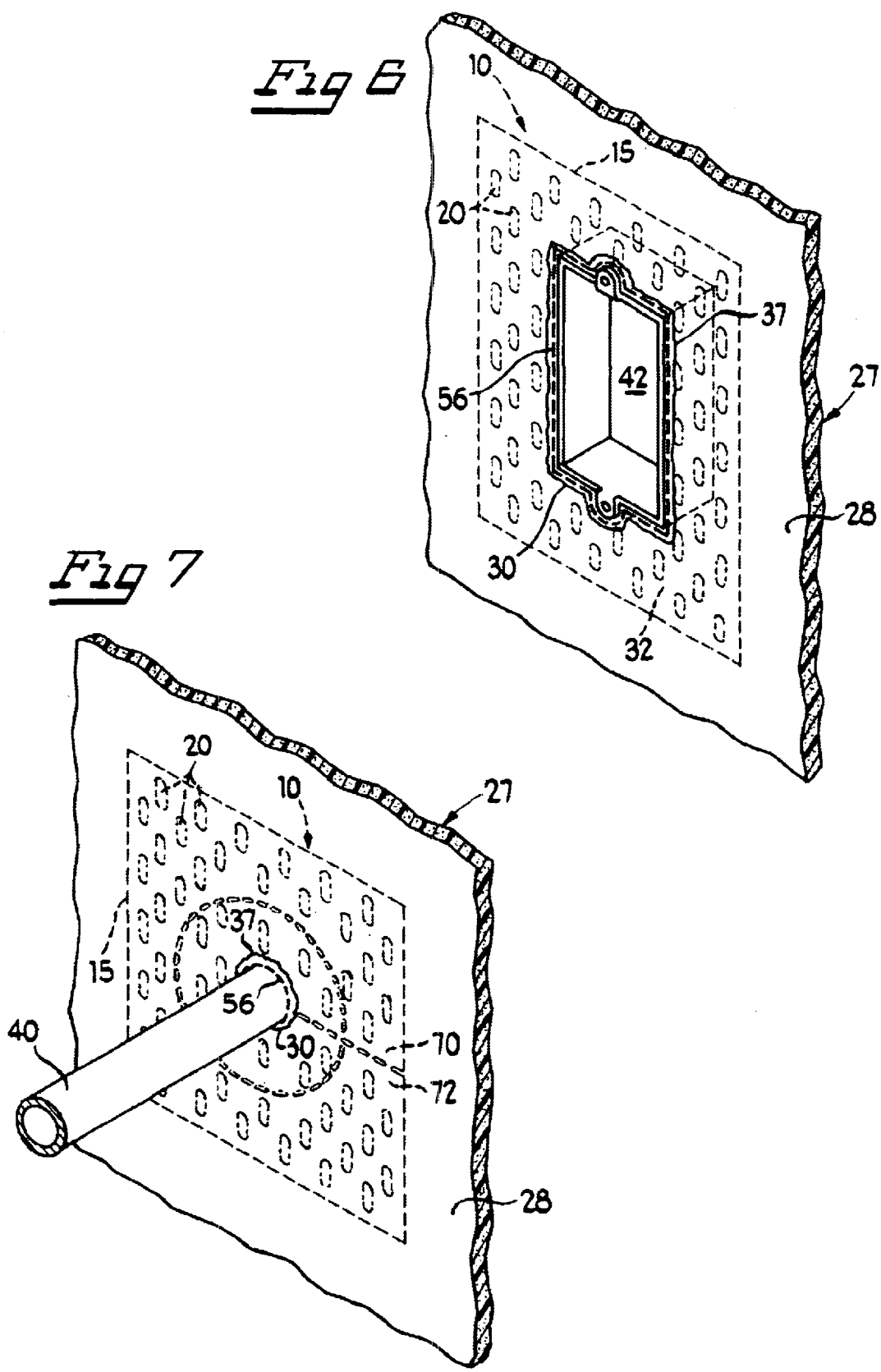

SURFACE REPAIR ASSEMBLY INCLUDING NON-METALLIC REPAIR PATCH

This application is a continuation-in-part of application Ser. No. 09/022,395, filed Feb. 12, 1998 now U.S. Pat. No. 6,231,949.

BACKGROUND OF THE INVENTION

1. Field of the Invention

This invention relates generally to repair materials and more particularly to a surface repair patch and a method of using the surface repair patch together with a curable repair compound to close an opening around a fixture which is adjacent to or protrudes from a surface.

2. Description of the Related Art

There has long been a need in the art for inexpensive wall repair systems, which are relatively uncomplicated and which may be utilized by the non-professional, such as the homeowner. Various wall or surface repair systems that utilize a repair patch have been proposed as an option for repairing damaged portions of surfaces, such as holes in drywall material. These repair patches are designed so as to reinforce and position the curable repair materials, such as plaster or polymeric materials, that are applied to the surface being repaired.

While these repair patches have produced satisfactory results, certain repairs to openings in drywall or plaster around fixtures such as electric boxes, light fixtures, drain pipes and gas pipes have been rendered difficult because of the inability to form a correctly fitting matching surface for surrounding the fixture. For instance, certain repair patches include a rigid plate which is formed from a metallic material. This type of repair patch typically cannot be cut freely to include an opening in the patch as the rigid plate may be formed from metal strip of a relatively thick gauge.

Repair patches consisting of a deformable mesh-like metallic sheet are available as alternatives to repair patches including a rigid metallic plate. For example, U.S. Pat. No. 5,298,099 discloses a contourable surface repair compound matrix which may be used to provide a matching surface for holding, positioning and reinforcing the repair materials applied to a surface being repaired. Depending on the thickness of metal used in the mesh-like metallic sheet, the mesh-like metallic sheet may be cut by scissors or other cutting means, and therefore, it may be possible to prepare a mesh-like metallic sheet with an opening for fitting around a fixture which is adjacent to or protrudes from a wall surface.

However, known repair patches do have certain drawbacks when used for repairing openings in drywall or plaster around fixtures. For example, each time that it is necessary to repair an opening around a fixture, a repair patch having an opening must be prepared using a time consuming, labor intensive process. Typically, this involves using a template to trace the outline of the fixture on the repair patch and then using a scissors to cut out the material inside the outline drawn on the patch. Furthermore, certain repair patches are formed from a heavier gauge material that can only be cut with power tools. This further complicates the preparation of a repair patch having an opening, especially for a non-professional who may not have access to power tools.

Therefore, there is a need for a surface repair patch that can be used to repair a hole in a wall, and can also be easily modified to include an opening that will fit around a fixture that is adjacent to or protrudes from a wall surface.

Accordingly, it is an object of the present invention to provide an inexpensive and uncomplicated surface repair patch for applying on the surface of a wall that has an opening around a fixture such as an electric box, a light fixture, a switch plate, a pipe or the like.

It is a further object of the present invention to provide a surface repair patch with a removable section that can be removed from the surface repair patch without the need for additional tools.

It is still another object of the present invention to provide a surface repair assembly which includes a non-metallic surface repair patch that may be plastically deformed in any direction so that the patch may be shaped to correspond to the contour of the surface.

It is yet another object of the present invention to provide a surface repair assembly which will provide a smooth transition between the wall surface and that of the wall repair compound applied over the surface repair patch to complete the repair.

SUMMARY OF THE INVENTION

The present invention makes a significant contribution to the surface repair art by providing an improved surface repair patch for closing an opening around a fixture that is adjacent to or protrudes from a surface. A surface repair patch having the features of the present invention includes a sheet which has a first side and a second side. The sheet includes openings which extend from the first side of the sheet to the second side of the sheet.

The sheet is preferably formed from a polymeric material such as a polyolefin, a polyvinyl resin, a blend of cellulosic fibers, and copolymers and mixtures thereof. In one version of the invention, the openings are arranged about the sheet so that a network of strips of polymeric material is formed, the strips being joined by an array of junctions. Each of the strips is capable of being plastically deformed in any direction so that the sheet may be shaped to correspond to the contour of the surface being repaired. The sheet supports, positions, and reinforces the curable repair compound on the surface before the repair compound is cured. In another version of the invention, the second side of the repair patch includes an adhesive for affixing the patch to the surface to be repaired.

The sheet of the surface repair patch includes a removable first section which has a border defined by a first line of holes. The first line of holes is configured such that the removable first section may be removed from the sheet by applying pressure to the removable first section. When pressure is applied to the removable first section, strips of material between the holes fracture and the removable first section can be removed from the sheet. The border of the removable first section can be configured in an infinite number of shapes so that the opening produced in the sheet may be of any shape.

In another version of the invention, the sheet of the repair patch further includes a removable second section having a border defined by a second line of holes. The second line of holes facilitate removal of the removable second section from the sheet in the same manner that the first line of holes facilitates removal of the removable first section. The second line of holes may be arranged on the sheet in an infinite number of patterns but certain highly advantageous arrangements of the second line of holes are preferred. In a first preferred arrangement of the second line of holes, the second line of holes is arranged between the periphery of the sheet and the border of the removable first section. In this arrangement, the removable second section surrounds the removable first section. In a second preferred arrangement of the second line of holes, the second line of holes extends from a first location on the first line of holes to a second location on the first line of holes. In this arrangement, the removable second section will surround a portion of the removable first section.

The use of a removable first section and a removable second section in the sheet of the surface repair patch allows the user to prepare surface repair patches having different sized openings from a single surface repair patch. For example, in the arrangement of the sheet wherein the removable second section surrounds the removable first section, the user could prepare surface repair patches having two different openings, i.e., a patch having a smaller opening could be prepared by removing the removable first section, and a patch having a larger opening could be prepared by removing both the removable first section and the removable second section.

In still another version of the invention, the sheet of the repair patch further includes a third line of holes which extends from the border of the removable first section to the periphery of the sheet. The third line of holes facilitates separation of a first portion of the sheet, which is on a first side of the third line of holes, from a second portion of the sheet, which is on a second side of the third line of holes. A user may grasp the sheet on the first side of the third line of holes and on the second side of the third line of holes and pull the first portion of the sheet and the second portion of the sheet in opposite directions so as to fracture strips of material between the holes and thereby separate the first portion from the second portion of the sheet. The separation between the first portion and the second portion of the repair patch allows the repair patch to be slid transversely over a fixture such as a pipe when anchoring the repair patch on a surface.

The present invention is also directed to a method of using a surface repair patch together with a curable repair compound to close an opening around a fixture which is adjacent to or protrudes from a surface. The method involves selecting a surface repair patch which comprises a sheet having a first side, a second side, a plurality of openings extending from the first side to the second side of the sheet, and a removable section. The repair patch should be of sufficient area to surround the opening in the surface. After selecting a suitable repair patch, the repair patch may optionally be shaped to correspond to the contour of the surface being repaired. The surface repair patch is then grasped and pressure is applied to the removable section of the sheet in order to remove the removable section of the sheet. This creates an alignment edge of the sheet where the border of the removable section was previously located. The surface repair patch is then anchored to the surface so that the alignment edge of the sheet is adjacent to the outer surface of the fixture. A curable repair compound is then spread over the repair patch so as to cover the repair patch and substantially fill up the openings in the patch. Examples of curable repair compounds useable with the surface repair patch include plaster of paris, gypsum material, spackling compound, joint compound, and fiberglass resin compound. The repair compound is then contoured to the shape of the surface and allowed to cure.

BRIEF DESCRIPTION OF THE DRAWINGS

These and other features, aspects, objects, and advantages of the present invention will be become better understood upon consideration of the following detailed description, appended claims and accompanying drawings where:

FIG. 1 is a perspective view of one embodiment of a surface repair patch in accordance with the present invention;

FIG. 2 is a top view of a section of the sheet of a second embodiment of a surface repair patch in accordance with the present invention showing the openings in the surface repair patch which define a mesh-like structure;

FIG. 3 is an enlarged cross-sectional view taken along lines 3—3 of FIG. 2, further showing the substantially planar structure of the sheet forming the surface repair patch of the present invention, and further showing thereon surface repair compound, and yet further showing thereon adhesive disposed on one side thereof for securing the surface repair patch to the object to be repaired;

FIG. 4 is a perspective view of a third embodiment of a surface repair patch in accordance with the present invention;

FIG. 5 is a perspective view of a fourth embodiment of a surface repair patch in accordance with the present invention;

FIG. 6 is a perspective view of a section of drywall, showing in phantom lines a surface repair patch in accordance with the first embodiment of the present invention disposed thereon and covering and repairing an opening around an electric box in the drywall; and FIG. 7 is a perspective view of a section of drywall, showing in phantom lines a surface repair patch in accordance with the third embodiment of the present invention disposed thereon and covering and repairing an opening around a pipe protruding from the drywall.

It should be understood that the drawings are not necessarily to scale and that the embodiments are sometimes illustrated by phantom lines and fragmentary views. In certain instances, details which are not necessary for an understanding of the present invention or which render other details difficult to perceive may have been omitted. It should be understood, of course, that the invention is not necessarily limited to the particular embodiments illustrated herein. Specifically, it should be noted that the present invention has been illustrated by a version of the invention that is used to repair damaged drywall surfaces. However, the surface repair assembly of the present invention is suitable for repair of various surfaces including surfaces made from metal, wood, fiberglass, plastic, drywall and wallboard.

Like reference numerals will be used to refer to like or similar parts from Figure to Figure in the following description of the drawings.

DESCRIPTION OF THE PREFERRED EMBODIMENTS

Referring now to FIG. 1, one embodiment of a surface repair patch in accordance with the present invention is shown. This embodiment of the surface repair patch 10 is suitable for use in closing an opening around an electric box and the like. The surface repair patch 10 comprises a sheet 12. The sheet has a first side 16, a second side 13 (as shown in FIG. 3), edges forming a periphery 15, and a plurality of openings 20 which extend from the first side 16 to the second side 13 of the sheet 12. The sheet 12 includes a removable first section 50 which has a border 52 defined by a line of holes 54. It can be seen that the border 52 of the removable first section 50 is within the periphery 15 of the sheet 12. In the embodiment shown, the line of holes 54 is arranged so that the border 52 is in the shape of an electric box; however, any number of shapes is possible. The line of holes 54 is configured such that the removable first section 50 may be removed from the sheet 12 by applying pressure to the removable first section 50, i.e., when pressure is applied to the removable first section 50, strips 55 of material between the holes 54 fracture and the removable first section 50 can be removed from the sheet 12, thereby forming an alignment edge 56, which in this embodiment is in the shape of an electric box. It can be appreciated that the amount of pressure needed to remove the removable first section 50 from the sheet 12 varies depending on factors such as the type of material used for the sheet 12 and the width and thickness of the strips 55 of material.

Referring now to FIGS. 2–3, there is shown a section of the sheet 12 of a second embodiment of the surface repair patch 10 as used in a surface repair assembly 8. The sheet 12 has a first side 16 and a second side 13. The second side 13 supports an adhesive 14 for attachment of the surface repair patch 10 to the wall surface or similar object to be repaired. For purposes of the present invention, the term "wall surface" includes the facing surfaces of both vertical walls and ceilings, and whether made of drywall, plaster or other wall material.

Referring more particularly to FIG. 2, it can be seen that the surface repair assembly 8 broadly comprises the surface repair patch 10 and a layer of curable surface repair compound 25. The sheet 12 of the surface repair patch 10 has a series of openings 20 which extend from the first side 16 to the second side 13 of the sheet 12. The openings 20 are arranged about the sheet 12 so that a network of strips 22 of material is formed. The strips 22 are joined by an array of junctions 23, which, in the embodiment shown in FIG. 2, give the sheet 12 the appearance of a mesh-like structure.

Referring now to FIG. 3, a cross-section of the structure of the surface repair assembly 8 is shown. The sheet 12 of the surface repair patch 10 has a second side 13 which is adapted to receive adhesive 14. The adhesive 14 is preferably a pressure sensitive adhesive and is applied to the second side 13 of sheet 12 for securing the surface repair patch 10 to the surface to be repaired. The first side 16 of the sheet 12 is adapted to receive a curable repair compound 25.

The sheet 12 of the surface repair patch 10 may be formed from a metallic or nonmetallic material and preferably is formed from a plastically deformable inelastic polymeric material. As used throughout the specification and claims, a plastically deformable inelastic material refers to a material that will deform and will not completely return to its original shape when a force is applied to the material. The polymeric material though being inelastic is nevertheless easily deformable. Therefore, the polymeric material will substantially retain its shape after it has been bent and/or twisted into a desired form.

Suitable plastically deformable inelastic polymeric materials that may be used to form the sheet 12 include polyolefins, such as polyethylene and polypropylene, polyvinyl resins, and copolymers and mixtures thereof. Material containing blends of cellulosic fibers, such as paper, may also be used for forming the sheet 12. Polyvinyl resins that are inelastic but deformable, such as polyvinyl butyral resins or polyvinyl chloride, are particularly advantageous when used to form the sheet 12 of the surface repair patch 10. The polymeric material may also be blended with a filler selected from the group consisting of metal carbonates, metal silicates, metal oxides, glass fibers, wood sawdust, and wood flour. The filler may serve to increase the rigidity of the polymeric material and may even lower the cost of forming the sheet. The rigidity of the polymeric material may also be increased by increasing the density of the polymeric material used to form the sheet.

By forming the sheet 12 of the surface repair patch 10 from a plastically deformable inelastic polymeric material and providing the sheet 12 with plurality of openings 20, a highly effective contourable surface repair patch is developed. It can be seen from FIG. 2 that the openings 20 in the sheet 12 form a grid structure. The grid structure is defined by strips 22 of material which are connected at junctions 23. While the openings 20 shown in the embodiment of FIG. 2 are square, the openings 20 may be any of various shapes including round, square, diamond, rectangular and oblong as shown in FIGS. 1 and 4–7. Preferably, the openings 20 are of a uniform size and are regularly spaced about the sheet 12.

The arrangement of a plurality of strips 22 of plastically deformable inelastic polymeric material allows the surface repair patch 10 to deformed into an infinite number of shapes. Specifically, each one of the strips 22 may be twisted, bent, stretched or compressed depending on the forces applied to the sheet. Upon deforming, the strips 22 preferably retain their shape so that the surface repair patch 10 assumes a stable configuration. Because a large number of strips 22 of material are present in each repair patch 10 and each strip 22 is capable of being deformed into numerous positions, an infinite number of stable configurations of the repair patch are possible. Therefore, the surface repair patch 10 may be shaped to correspond to the contour of virtually any surface and may be used for supporting, positioning and reinforcing a curable surface repair compound. Of course, the surface repair patch 10 is also suitable for the repair flat surfaces, in which case, the surface repair patch 10 is applied to the surface without the need for shaping.

It is preferred that the plastically deformable inelastic polymeric material selected for use in the sheet 12 of the repair patch 10 is able to be smoothed and abraded by sandpaper or other abrasive material which is conmmonly selected for smoothing cured surface repair compound to a desired surface finish. Namely, it is preferred that the polymeric material may be smoothed and abraded by a grade of sandpaper or similar abrasive material which is customarily selected for finishing cured surface portions of curable surface repair compound such as plaster of paris, gypsum material, spackling compound, joint compound, fiberglass resin compound, spackle and the like. By selecting a polymeric material according to this parameter, it is assured that any repair patch material that is accidently exposed after the curable repair compound has dried may be sanded smooth with the remaining repair compound and suitably finished.

Turning now to FIG. 4, a third embodiment of a surface repair patch in accordance with the present invention is shown. The third embodiment of the surface repair patch 10 is suitable for use in closing an opening around a circular fixture such as a light fixture, pipe, and the like. The surface repair patch 10 comprises a sheet 12. The sheet has a first side 16, a second side 13 (as shown in FIG. 3), edges forming a periphery 15, and a plurality of openings 20 which extend from the first side 16 to the second side 13 of the sheet 12. The sheet 12 includes a removable first section 50 which has a border 52 defined by a first line of holes 54. It can be seen that the border 52 of the removable first section 50 is within the periphery 15 of the sheet 12. In the embodiment shown, the first line of holes 54 is arranged so that the border 52 is in a circular shape; however, any number of shapes is possible. The first line of holes 54 is configured such that the removable first section 50 may be removed from the sheet 12 by applying pressure to the removable first section 50, i.e., when pressure is applied to the first interior section 50, strips 55 of material between the holes 54 fracture and the removable first section 50 can be removed from the sheet 12, thereby forming an alignment edge 56, which in this embodiment is in a circular shape.

The sheet 12 of the third embodiment of the surface repair patch also includes a removable second section 60. The removable second section 60 has a border 62 defined by a second line of holes 64. It can be seen that the border 62 of the removable second section 60 is within the periphery 15 of the sheet 12. In the embodiment shown, the second line of holes 64 is arranged so that the border 62 is in a circular shape; however, any number of shapes is possible. The second line of holes 64 is configured such that the removable second section 60 may be removed from the sheet 12 by applying pressure to the removable second section 60, i.e., when pressure is applied to the removable second section 60, strips 65 of material between the holes 64 fracture and the removable second section 60 can be removed from the sheet 12, thereby forming a second alignment edge 66, which in this embodiment is in a circular shape.

It can be appreciated that the use of two removable sections 50,60 in the third embodiment of the surface repair patch 10 allows the surface repair patch 10 to be used to repair openings surrounding different sized fixtures. For instance, a user may choose to only remove the removable first section 50 from the sheet 12 in order to form a smaller opening in the sheet 12. Alternatively, the user may choose to remove the removable first section 50 and the removable second section 60 from the sheet 12, in which case a larger opening is formed in the sheet. Of course, further removable sections could be added to the sheet so that even more sizes of openings could be formed from a single surface repair patch. Because the removable second section 60 may not be removed from the sheet 12 in certain applications, openings 20 are provided in the removable second section 60 whereas in the third embodiment shown, the removable first section 50 does not include openings.

The sheet 12 of the third embodiment of the surface repair patch further includes a third line of holes 68 which extend from the border 52 of the removable first section 50 to the periphery 15 of the sheet 12. The third line of holes 68 serves as a dividing line between a first portion 70 of the sheet 12 which is on a first side of the third line of holes 68 and a second portion 72 of the sheet 12 which is on a second side of the third line of holes 68. The third line of holes 68 is configured such that the first portion 70 of the sheet 12 may be separated from the second portion 72 of the sheet 12 in a variety of ways. For example, a user may grasp the sheet 12 on the first side of the third line of holes 68 and on the second side of the third line of holes 68 and may pull the first portion 70 of the sheet 12 and the second portion 72 of the sheet in opposite directions so as to fracture the strips 69 of material between the holes 68. Alternatively, the user may grasp the sheet 12 on the first side of the third line of holes 68 and on the second side of the third line of holes 68 and use a tearing motion to fracture the strips 69 of material between the holes 68.

By incorporating the third line of holes 68 into the third embodiment of the surface repair patch 10, the potential uses of the surface repair patch 10 are expanded and the surface repair patch 10 solves a problem in the surface repair field. Often, a pipe that protrudes from a wall surface will be joined to another device that is located near the wall surface. For example, a hot water pipe that protrudes from a wall may be joined to a radiator located near the wall surface. When it becomes necessary to close an opening in the dry wall around this pipe, a surface repair patch having only a circular opening would not be suitable as the surface repair patch could not be installed axially over the pipe as access to the pipe is blocked by the radiator. In addition, it would be very impractical to remove the pipe from the radiator in order to insert the pipe through the opening in the surface repair patch.

Upon review of the third embodiment of a surface repair patch shown in FIG. 4, it can be appreciated that this surface repair patch would be suitable for closing an opening around a pipe that is joined to a device located near or away from the wall surface. Specifically, by separating the first portion 70 of the sheet 12 from the second portion 72 of the sheet 12 at the third line of holes 68, a pathway to the circular opening in the sheet 12 is formed. The surface repair patch may then be installed over the pipe by moving the surface repair patch transversely over the pipe with the first portion 70 of the sheet 12 passing on one side of the pipe and the second portion 72 of the sheet 12 passing on the other side of the pipe. Once the surface repair patch 10 is over the pipe, the first portion 70 and the second portion 72 of the sheet 12 may be restored into an aligned adjacent relationship when the surface repair patch 10 is anchored to the wall surface.

Referring now to FIG. 5, a fourth embodiment of a surface repair patch in accordance with the present invention is shown. The fourth embodiment of the surface repair patch 10 is suitable for use in closing an opening around different sizes of electric boxes. The surface repair patch 10 comprises a sheet 12. The sheet has a first side 16, a second side 13 (as shown in FIG. 3), edges forming a periphery 15, and a plurality of openings 20 which extend from the first side 16 to the second side 13 of the sheet 12. The sheet 12 includes a removable first section 50 which has a border 52 defined by a first line of holes 54. It can be seen that the border 52 of the removable first section 50 is within the periphery 15 of the sheet 12. In the embodiment shown, the first line of holes 54 is arranged so that the border 52 is in the shape of a two outlet electric box; however, any number of shapes is possible. The first line of holes 54 is configured such that the removable first section 50 may be removed from the sheet 12 by applying pressure to the removable first section 50, i.e., when pressure is applied to the removable first section 50, strips 55 of material between the holes 54 fracture and the removable first section 50 can be removed from the sheet 12, thereby forming an alignment edge 56, which in this embodiment is in the shape of an electric box.

The sheet 12 of the fourth embodiment of the surface repair patch also includes a removable second section 60. The removable second section 60 has a border 62 defined by a second line of holes 64. It can be seen that the second line of holes 64 extends from a first location 76 on the first line of holes 54, through an area bounded by the first line of holes 54 and the periphery 15 of the sheet 12, to a second location 80 on the first line of holes 54. It can also be seen that this arrangement of the second line of holes 64 and the first line of holes 54 creates a rectangular section bordered by the second line of holes 64 and a portion of the first line of holes 54 between the first location 76 and the second location 80 on the first line of holes 54. Of course, the second line of holes 64 could be arranged to produce any number of shapes. The second line of holes 64 is configured such that the removable second section 60 may be removed from the sheet 12 by applying pressure to the removable second section 60, i.e., when pressure is applied to the removable second section 60, strips 65 of material between the holes 64 fracture and the removable second section 60 can be removed from the sheet 12, thereby forming a second alignment edge 66, which in this embodiment is in the shape of a rectangular four outlet electric box. It can be appreciated that the incorporation of the removable second section into the fourth embodiment of the surface repair patch expands the potential uses of the surface repair patch as the patch can be used to close an opening around two different sized fixtures, i.e., a two outlet and a four outlet electric box. Given the standardization of the size of electric boxes in the home construction industry, it is evident the fourth embodiment of the surface repair patch would be suitable for a large percentage of surface repair projects wherein an opening around an electric box must be closed.

Turning now to FIG. 6, the first embodiment of a surface repair patch 10 in accordance with the present invention is shown disposed on a section of drywall generally designated at 27. The drywall section 27 has an outside surface 28 which is exposed when the drywall is installed on wooden studs. The first embodiment of the surface repair patch 10 is shown in phantom covering an opening 30 in the drywall which surrounds an electric box 42. The opening 30 has a perimeter 37.

The surface repair patch 10 is applied to repair opening 30 in drywall section 27 by covering surface repair patch 10 with a thin layer of plaster of paris, gypsum material, spackling compound, joint compound, fiberglass resin compound, spackle or other curable repair compound 25 which completes the assembly. It can be seen that a portion 32 of the outside surface 28 of the drywall section 27 which lies between the perimeter 37 of the opening 30 and the periphery 15 of the surface repair patch 10 is covered by the surface repair patch. An adhesive coating 14 may be disposed on the second side 13 of sheet 12 over at least a substantial portion of the second side 13 of sheet 12 and alternatively over the entire second side 13 of sheet 12 for firmly bonding sheet 12 to the exposed surface 28 of the drywall section 27.

An opening 30 surrounding a fixture such as an electric box that is adjacent to a drywall section 27 can be repaired in accordance with the method of the present invention. First, a repair patch 10 in accordance with the present invention is selected for use in the method. The repair patch 10 should be of sufficient area to surround the opening 30 in the drywall and includes an adhesive on its second side 13.

After a surface repair patch 10 of a suitable size has been selected, the user grasps the surface repair patch 10 and applies pressure to the removable first section 50 of the sheet 12 thereby removing, the removable first section 50 of the sheet 12. This creates an alignment edge 56 of the sheet 12 as seen in FIG. 6. The repair patch 10 is then positioned on the outside surface 28 of the drywall section 27 so that the alignment edge 56 of the sheet 12 is adjacent to an outer surface of the fixture. For instance, it can be seen from FIG. 6 that the alignment edge 56 of the first embodiment of the repair patch 10 is been placed adjacent to the outer surface of the electric box which has been mounted in the wall. It can also be seen that the periphery 15 of the surface repair patch 10 surrounds the perimeter 37 of the opening 30 in the drywall section 27. Pressure is applied to the surface repair patch 10 so as to anchor the surface repair patch 10 to the outside Surface 28 of the drywall section 27.

A curable repair compound 25, such as plaster of Paris, gypsum material, spackling compound, joint compound, fiberglass resin compound, or the like, is then spread over the repair patch 10 and portions of the outside surface 28 of the drywall section 27 near the periphery 15 of the surface repair patch 10. The repair compound 25 is then contoured with a flat-bladed tool so as to blend into the outside surface 28 of the drywall section 27. Preferably, the repair compound 25 is contoured so that it is substantially smooth with the outside surface 28 of the drywall section 27. It can be appreciated that only a small amount of repair compound is required in the method of the invention in order to cover the surface repair patch 10 and portions of the outside surface 28 of the drywall section 27 near the edges 15 of the surface repair patch 10. In contrast, other prior methods often require building up and finishing a number of layers of finishing compound. After the repair compound has been contoured to the outside surface 28 of the drywall section 27, the repair compound is allowed to cure. Optionally, outer surface portions of the repair compound may be sanded with an abrasive material to obtain a desired surface finish after the repair compound has been cured. Thus, a surface repair assembly can be prepared using only a repair patch 10 and a curable surface repair compound 25.

Various advantageous modifications of the method of the present invention are also possible. For example, in an alternative version of the method of the invention, a surface repair patch 10 that does not include an adhesive may be used to repair the hole in the drywall. In this version of the invention, the surface repair patch 10 may be anchored to the outside surface 28 of the drywall 27 in a number of different manners. For instance, the surface repair patch 10 can be positioned on the outside surface 28 of the drywall section 27 so that the alignment edge 56 of the sheet 12 is adjacent to an outer surface of the fixture and the periphery 15 of the surface repair patch 10 surrounds the perimeter 37 of the opening 30, and then the surface repair patch can be nailed or stapled to the surface surrounding the opening 30. Alternatively, the surface repair patch 10 can be secured to the outside surface 28 of the drywall section 27 by applying curable repair compound 25 to the portion 32 of the outside surface 28 of the drywall section 27 that is adjacent the perimeter 37 of the opening 30, positioning the surface repair patch 10 on the outside surface 28 of the drywall 27 so that the alignment edge 56 of the sheet 12 is adjacent to an outer surface of the fixture and the periphery 15 of the surface repair patch 10 surrounds the perimeter 37 of the opening 30, and then applying pressure to the surface repair patch 10 so that the surface repair patch 10 adheres to the curable repair compound 25.

The openings 20 in the sheet 12 of the surface repair patch 10 allow the curable surface repair compound 25 to flow or penetrate the surface of the repair patch 10 so that the surface repair patch 10 actually repairs the damaged area on the inside as well as the outside of the damaged wall or similar surface. It has been found that a surface repair patch configuration wherein the openings 20 are regularly spaced about the first side 16 of the sheet 12 and are of a uniform size, i.e. each of the openings is substantially the same size, is desirable. The arrangement of regularly spaced, uniform sized openings allows the curable surface repair compound 25 to flow uniformly when applied to the first side 16 of the sheet 12 of the surface repair patch 10. This makes it easier for the user to apply a smooth uniform layer of curable surface repair compound 25.

Turning now to FIG. 7, the third embodiment of a surface repair patch 10 in accordance with the present invention is shown disposed on the drywall section 27. The third embodiment of the surface repair patch 10 is shown in phantom covering an opening 30 in the drywall which surrounds a pipe 40. The opening 30 has a perimeter 37.

The surface repair patch 10 is applied to repair opening 30 in drywall section 27 by covering surface repair patch 10 with a thin layer of plaster of paris, gypsum material, spackling compound, joint compound. fiberglass resin compound, spackle or other curable repair compound 25 which completes the assembly. It can be seen that a portion 32 of the outside surface 28 of the drywall section 27 which lies between the perimeter 37 of the opening 30 and the periphery 15 of the surface repair patch 10 is covered by the surface repair patch. An adhesive coating 14 may be disposed on the second side 13 of sheet 12 over at least a substantial portion of the second side 13 of sheet 12 and alternatively over the entire second side 13 of sheet 12 for firmly bonding sheet 12 to the exposed surface 28 of the drywall section 27.

An opening 30 surrounding a fixture such as a pipe 40 which protrudes from a drywall section 27, as shown in FIG. 7, can be repaired in accordance with another version of the method of the present invention. First, a repair patch 10 in accordance with the third embodiment of the present invention, as shown in FIG. 4, is selected for use in the method. The repair patch 10 should be of sufficient area to surround the opening 30 in the drywall and includes an adhesive on its second side 13.

After a surface repair patch 10 of a suitable size has been selected, the user grasps the surface repair patch 10 and applies pressure to the removable first section 50 of the sheet thereby removing the removable first section 50 of the sheet 12 and creating an alignment edge 56 of the sheet 12. As detailed above, the third embodiment of the surface repair patch shown in FIG. 4 also includes a removable second section 60 which may be removed from the sheet by application of pressure. It can be appreciated that the removal of the removable second section 60 (and any additional sections) of the sheet 12 would be dictated by the size of the pipe 40 which protrudes from the drywall section 27 as it is preferred that the alignment edge formed when a section is removed from the sheet closely match the contour of the outside surface of the pipe 40.

The opening in the repair patch 10 is then moved axially over the pipe 40 and the repair patch 10 is positioned on the outside surface 28 of the drywall section 27 so that the alignment edge 56 of the sheet 12 is adjacent to an outer surface of the pipe as shown in FIG. 7. It can also be seen that the periphery 15 of the surface repair patch 10 surrounds the perimeter 37 of the opening 30 in the drywall section 27. Pressure is applied to the surface repair patch 10 so as to anchor the surface repair patch 10 to the outside surface 28 of the drywall section 27.

A curable repair compound 25, such as plaster of paris, gypsum material, spackling compound, joint compound, fiberglass resin compound, or the like, is then spread over the repair patch 10 and portions of the outside surface 28 of the drywall section 27 near the periphery 15 of the surface repair patch 10. The repair compound 25 is then contoured with a flat-bladed tool so as to blend into the outside surface 28 of the drywall section 27. Preferably, the repair compound 25 is contoured so that it is substantially smooth with the outside surface 28 of the drywall section 27.

In the event that the pipe 40 shown in FIG. 7 is joined to another device (such as a radiator as described above) such that axial access to the pipe is blocked, another version of the method of the invention can be used to close an opening around the pipe. In this version of the method, a repair patch 10 in accordance with the third embodiment of the present invention, as shown in FIG. 4, is selected. The repair patch 10 should be of sufficient area to surround the opening 30 in the drywall and includes an adhesive on its second side 13.

After a surface repair patch 10 of a suitable size has been selected, the user grasps the surface repair patch 10 and applies pressure to the removable first section 50 of the sheet thereby removing the removable first section 50 of the sheet 12 and creating an alignment edge 56 of the sheet 12. If necessary, the removable second section 60 of the surface repair patch 10 may be removed from the sheet 12 by application of pressure.

The user then grasps the surface repair patch 10 and applies force to the first portion 70 and the second portion 72 of the sheet 12 in order to separate the first portion 70 of the sheet 12 from the second portion 72 of the sheet 12. By separating the first portion 70 of the sheet 12 from the second portion 72 of the sheet 12 at the third line of holes 68, a pathway to the circular opening in the sheet 12 is formed. The surface repair patch 10 may then be installed over the pipe 40 by moving the surface repair patch 10 transversely over the pipe 40 with the first portion 70 of the sheet 12 passing on one side of the pipe and the second portion 72 of the sheet 12 passing on the other side of the pipe. As shown in FIG. 7, when the surface repair patch 10 is moved transversely over the pipe, the surface repair patch 10 remains generally parallel to the wall surface 28. Once the surface repair patch 10 is over the pipe, the first portion 70 and the second portion 72 of the sheet 12 are restored into an aligned adjacent relationship. The repair patch 10 is then positioned on the outside surface 28 of the drywall section 27 so that the alignment edge 56 of the sheet 12 is adjacent to an outer surface of the pipe as shown in FIG. 7 and so that the periphery 15 of the surface repair patch 10 surrounds the perimeter 37 of the opening 30 in the drywall section 27. Pressure is applied to the surface repair patch 10 so as to anchor the surface repair patch 10 to the outside surface 28 of the drywall section 27.

A curable repair compound 25 is then spread over the repair patch 10 and portions of the outside surface 28 of the drywall section 27 near the periphery 15 of the surface repair patch 10. The repair compound 25 is then contoured with a flat-bladed tool so as to blend into the outside surface 28 of the drywall section 27. Preferably, the repair compound 25 is contoured so that it is substantially smooth with the outside surface 28 of the drywall section 27.

The materials and configurations used in the sheet 12 of the surface repair patch 10 provide for a sheet that can be inexpensively manufactured. For instance, certain vinyl materials can be cut to any size, such as 4"×4" or 6"×6", and perforated to include any of a number of hole shapes using a steel rule die. In addition, the polymeric materials preferably used in the sheet of the surface repair patch are generally easy to recycle and are accepted by most recyclers.

Thus, it is seen that an improved surface repair patch, and an improved method of using a surface repair pitch together with a curable repair compound to close an opening around a fixture which is adjacent to or protrudes from a surface is provided. The present invention provides an inexpensive and relatively uncomplicated surface repair assembly patch which can be applied on a surface having a hole to be repaired. The surface repair assembly provides a smooth transition between the surface and that of the repair compound applied over the surface repair patch to complete the repair. The surface repair assembly is suitable for repair of various surfaces including surfaces made from metal, wood, fiberglass, plastic, drywall and wallboard.

Although the present invention has been described in detail with reference to certain preferred embodiments, one skilled in the art will appreciate that the present invention can be practiced by other than the preferred embodiments, which have been presented for purposes of illustration and not of limitation. Therefore, the spirit and scope of the appended claims should not be limited to the description of the preferred embodiments contained herein.

What is claimed is:

1. A surface repair patch assembly for closing an opening around a fixture adjacent a surface, the surface repair patch assembly comprising:

a curable repair compound;

a flat sheet comprised of polymeric material having a first side, a second side, a periphery, and a plurality of openings extending from the first side to the second side of the sheet, the openings are arranged about the sheet so that a network of strips of material is formed, the strips being joined by an array of junctions, the strips capable of being plastically deformed in any direction so that the sheet may be shaped to correspond to the contour of the surface, and the openings in said sheet being sufficiently large to facilitate embedment of said sheet in a settable compound, the sheet including a removable section having a border defined by a first line of holes joined to said sheet by tearable segments of said polymeric material, the first line of holes and said tearable segments facilitating removal of the removable section from the sheet upon fracture of said tearable segments, said sheet and curable repair compound are mutually supporting each other to hold their position in a stable configuration on a surface before the repair compound is cured.

2. The surface repair patch assembly of claim 1 wherein:

the polymeric material is selected from the group consisting of polyolefins, polyvinyl resins, blends of cellulosic fibers, and copolymers and mixtures thereof.

3. The surface repair patch assembly of claim 2 wherein:

the polymeric material is polyvinyl chloride.

4. The surface repair patch assembly of claim 1 wherein:

the sheet further includes a removable second section having a border defined by a second line of holes, the second line of holes facilitating removal of the removable second section from the sheet.

5. The surface repair patch assembly of claim 4 wherein:

the border of the removable second section is between the periphery of the sheet and the border of the removable section.

6. The surface repair patch assembly of claim 5 wherein:

the sheet further includes a third line of holes extending from the border of the removable section to the periphery of the sheet, the third line of holes facilitating separation of a first portion of the sheet on a first side of the third line of holes from a second portion of the sheet on a second side of the third line of holes.

7. The surface repair patch assembly of claim 6 wherein:

the removable section of the sheet does not include openings.

8. A surface repair patch assembly for closing an opening around a fixture adjacent a surface, the surface repair patch assembly comprising:

a curable repair compound;

a flat sheet being comprised of polymeric material having a first side, a second side, a periphery, and a plurality of openings extending from the first side to the second side of the sheet, the openings are arranged about the sheet so that a network of strips of material is formed, the strips being joined by an array of junctions, the strips capable of being plastically deformed in any direction so that the sheet may be shaped to correspond to the contour of the surface, the polymeric material being one selected from the group consisting of polyolefins, polyvinyl resins, blends of cellulosic fibers, and copolymers and mixtures thereof, the second side of the repair patch including an adhesive, the sheet including a removable section having a border defined by a first line of detachment, said removable section of said sheet being joined to said sheet by tearable segments forming said first line of detachment, the first line of detachment facilitating removal of the removable section from the sheet upon fracture of said tearable segments, the openings in said sheet being sufficiently large to facilitate embedment of said sheet in a curable repair compound whereby said sheet and curable repair compound are mutually supporting each other to hold their position in a stable configuration on a surface before the repair compound is cured.

9. The surface repair patch assembly of claim 8 wherein:

the border of the removable second section is between the periphery of the sheet and the border of the removable section.

10. The surface repair patch assembly of claim 9 wherein:

the sheet further includes a third line of holes extending from the border of the removable section to the periphery of the sheet, the third line of holes facilitating separation of a first portion of the sheet on a first side of the third line of holes from a second portion of the sheet on a second side of the third line of holes.

11. The surface repair patch assembly of claim 8 wherein:

the removable section of the sheet does not include openings.

12. The surface repair patch assembly of claim 1 wherein:

the second side of the repair patch includes an adhesive.

* * * * *